United States Patent [19]

Spilker

[11] Patent Number: 4,857,262
[45] Date of Patent: Aug. 15, 1989

[54] SYSTEM FOR SINGULARIZING FUEL RODS IN A FUEL ELEMENT

[75] Inventor: Harry Spilker, Bad Munder, Fed. Rep. of Germany

[73] Assignee: Deutsche Gesellschaft fur Wiederaufarbeitung von Kernbrennstoffen mbH, Hanover, Fed. Rep. of Germany

[21] Appl. No.: 163,274

[22] Filed: Mar. 2, 1988

Related U.S. Application Data

[63] Continuation-in-part of Ser. No. 830,056, Feb. 14, 1986, abandoned.

[30] Foreign Application Priority Data

Feb. 15, 1985 [DE] Fed. Rep. of Germany ....... 3505242

[51] Int. Cl.$^4$ ............................................. G21C 19/33
[52] U.S. Cl. .................................... 376/261; 29/426.4
[58] Field of Search ............... 376/261, 272, 446, 463; 29/400 N, 426.3, 426.4, 723; 414/146, 7; 294/906; 252/627, 633; 83/923

[56] References Cited

U.S. PATENT DOCUMENTS

| | | | |
|---|---|---|---|
| 2,978,118 | 4/1961 | Goertz et al. | 414/7 |
| 3,293,734 | 12/1966 | Buckley | 29/426.3 |
| 3,514,838 | 6/1970 | Freeborg | 376/438 |
| 3,827,579 | 8/1974 | Kendall | 29/723 |
| 3,924,315 | 12/1975 | Cady et al. | 29/426.3 |
| 4,528,879 | 7/1985 | Eisenacher | 29/400 N |
| 4,678,624 | 7/1987 | Lahr et al. | 376/261 |
| 4,723,359 | 2/1988 | Blissell et al. | 376/261 |
| 4,773,148 | 9/1988 | Ohya et al. | 29/426.4 |

FOREIGN PATENT DOCUMENTS

| | | | |
|---|---|---|---|
| 2064853 | 7/1981 | United Kingdom | 376/261 |
| 2115599 | 9/1983 | United Kingdom | 376/261 |

Primary Examiner—Deborah L. Kyle
Assistant Examiner—Daniel Wasil
Attorney, Agent, or Firm—Allegretti & Witcoff, Ltd.

[57] ABSTRACT

A method and apparatus for separating the fuel rods (15) in a fuel element (8), whereby the former are retained in a bird cage arrangement (16, 18) between a head piece (19) and a foot piece (19'). The fuel elements (8) is located on a support table (6) with the help of a clamping arrangement (10). Before the fuel rods can be separated, the head piece and the foot piece are removed. In order to simplify removal of the fuel rods from the fuel element, to save space, and to minimize any risk of breakage after removal of the head piece (19) and the foot piece (19'), the bird cage arrangement (16,18) is progressively stripped from one layer of fuel rods to the next and from around the fuel rods. The exposed fuel rods are then lifted out of the fuel element (8) layer by layer and reshuffled in a more compact arrangement. A cutting tool (24), provided with a cutting disk head (26), is used to strip and separate the fuel rods with the help of a grappler (28). The grappler is used to bend the bird cage arrangement apart, bar by bar, after it is severed.

20 Claims, 4 Drawing Sheets

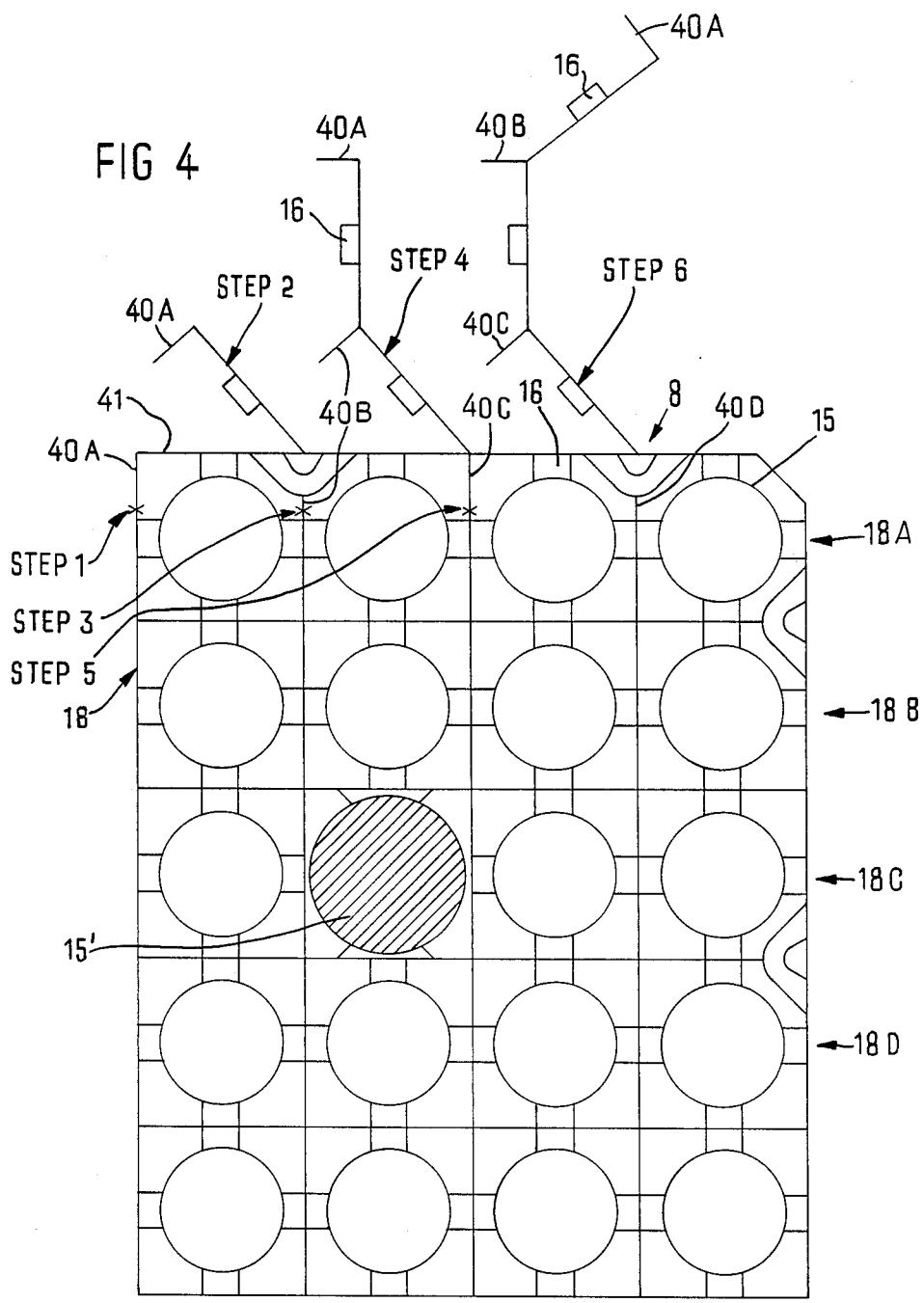

SYSTEM FOR SINGULARIZING FUEL RODS IN A FUEL ELEMENT

CROSS REFERENCE TO RELATED APPLICATION

This is a continuation-in-part application of Ser. No. 830,056, entitled "SYSTEM FOR SINGULIZING FUEL RODS IN A FUEL ELEMENT" and filed Feb. 14, 1986, now abandoned.

BACKGROUND OF THE INVENTION

The present invention concerns a method, in the wider concept of claim 1, an apparatus, for singularizing the fuel rods of a fuel element.

It is well known that a fuel element consists of a larger number of individual fuel rods. Such fuel rods comprise closed tubular cans containing nuclear fuel as well as a smaller number of control or absorber rods. With the help of spacers, which are arranged in the form of a grid cage, of a head piece, and of a foot piece, the fuel rods and the control rod guide tubes are arranged in a square matrix. Spent fuel elements are stored in the storage pool of the reactor or in storage containers, before reprocessing or final disposal. The spent fuel rods require a great deal of storage space in the matrix arrangements. Thus, it is desirable that the storage facility be as compact as possible. However, the fuel rods have to be singularizer for compact storage.

An apparatus is known from document EP-A No. 0066695 for consolidating spent fuel rods of fuel elements, which is provided with a fuel element head. The fuel element head is connected to control rod guide tubes. The fuel rods are maintained at a distance from one another by means of spacers. The foot of the fuel element can be firmly clamped in this arrangement. With the help of an arrangement of internal cutters, comprising a cutting tool, the head parts of the control guide tubes can be severed and removed together with the head itself. With the help of a grappler arrangement, the fuel rods can then be extracted and transferred to a consolidating stage. The consolidating stage is provided with guide tubes, one end of which is arranged in a first rack in exactly the same way as the fuel rods in the fuel element. The fuel rods themselves are inserted in the guide tubes. At their other end, the guide rods extend through a second rack in which they are arranged in a more compact way. The fuel rods are then advanced out of the guide tubes into a horizontal arrangement in which they are further consolidated and they are finally inserted in an arrangement in which they are consolidated vertically. After horizontal and vertical consolidation, the fuel rods are then placed in storage containers. This known arrangement is relatively complex. Moreover, the arrangement requires a great deal of space, since extra space has to be found corresponding to, the extended length of the rods. Since the guide tubes are positioned at an angle between the two parts of the rack and are bent along part of their length, there is always the danger of fracturing the fuel rods while they are being inserted into or extracted from these guide tubes.

An arrangement is shown in document U.S. Pat. No. 2,853,625 for unloading a number of spent uranium fuel rods from a reactor. The reactor is provided with a charging and a discharging side, whereby the rods are arranged in cladding tubes. This arrangement consists of a trolley which can travel both vertically and horizontally. The trolley is provided with a storage chamber partially filled with water. The trolley is also provided with a pick-up nose which can be aligned with a cladding tube. To expel the spent uranium rods, fresh fuel rods are inserted in the cladding tube on the charging side of the reactor. The spent uranium fuel rods are then pushed into a channel in the charging stage of the trolley on the discharge side of the reactor. The free end of the expelled spent rods is taken up by a piston which travels through the chamber under hydraulic power. The channel ends in this storage chamber. As soon as the end of the spent rod reaches the end of the channel, it will fall into the storage chamber. This process is repeated until the required number of uranium rods has dropped into the storage chamber. The increased space and complexity of this design are disadvantageous features of this arrangement. In particular, an extra chamber is required for the extraction of the fuel rods, and the chamber has to be at least twice the length of the rods. Furthermore, in this known singularizer process, there is always the risk of fracturing the rods as they are pushed out of the cladding tube or the channel of the pick-up nose as well as when they fall into the storage chamber.

In document DE-OS No. 27 30 723, an apparatus and a process are described for space saving disposal of channels for radioactive fuel material. With the help of a cutting arrangement, the square-sectioned empty metal tubular channels are cut open in a water bath. This produces four individual side plates, which can be placed on top of one another in a storage container to save space. This document, however, provides no indication of how the fuel is removed from the channels.

Document DE-PS No. 17 64 523 provides a description of an arrangement for severing the inert end zones of a fuel element in order to remove the nuclear fuel from the casing enclosed by the inert end zones. This cutting arrangement is provided with a holder to maintain the fuel element horizontally. The cutting arrangement takes the form of a band saw at each end zone. This holder can be moved towards the band saws so that both end zones can be pushed toward the band saws and can be cut off at the same time. However, this document does not contain any indication of how the fuel is removed from the casings, either.

SUMMARY OF THE INVENTION

The purpose of the present invention is to provide an improved version of the method or means and of the apparatus or arrangement of the type referred to above. With the present invention, the fuel rods can be more simply removed from a fuel element with less risk of breakage and with less space. Furthermore, this apparatus may be capable of operating in any position.

This requirement is met in the method according to the present invention, as set out in claim 1. An apparatus which meets this requirement is also described in claim 5.

With the solution provided by the present invention, it is no longer necessary to withdraw or expel the fuel rods from a fuel element. This invention makes it possible to decompose or break down a fuel element in an extremely limited space. No extra space is required to allow for the length of the fuel rod when it is withdrawn or expelled. The risk of fuel rod fracture has been almost entirely eliminated. Apart from some very fine shavings, when the bird cage is cut open, there are no large pieces of waste which have to be picked up separately and which might provide an obstacle to a remote controlled process. The process defined by the present invention is safer and more reliable and can be easily performed under remote control. The apparatus according to the present invention can be employed in a horizontal or a vertical configuration. Both the method and the apparatus are suitable for use in reactor plants as well as in shielded cells. That is, both the method and apparatus are suitable for use in either wet or dry environments.

Further useful and advantageous embodiments of the solution according to the present invention are characterized in the subclaims.

BRIEF DESCRIPTION OF THE DRAWING

The present invention will now be further explained with the help of the following drawings, where.

DETAILED DESCRIPTION OF THE PREFERRED EMBODIMENT

Figure 1:
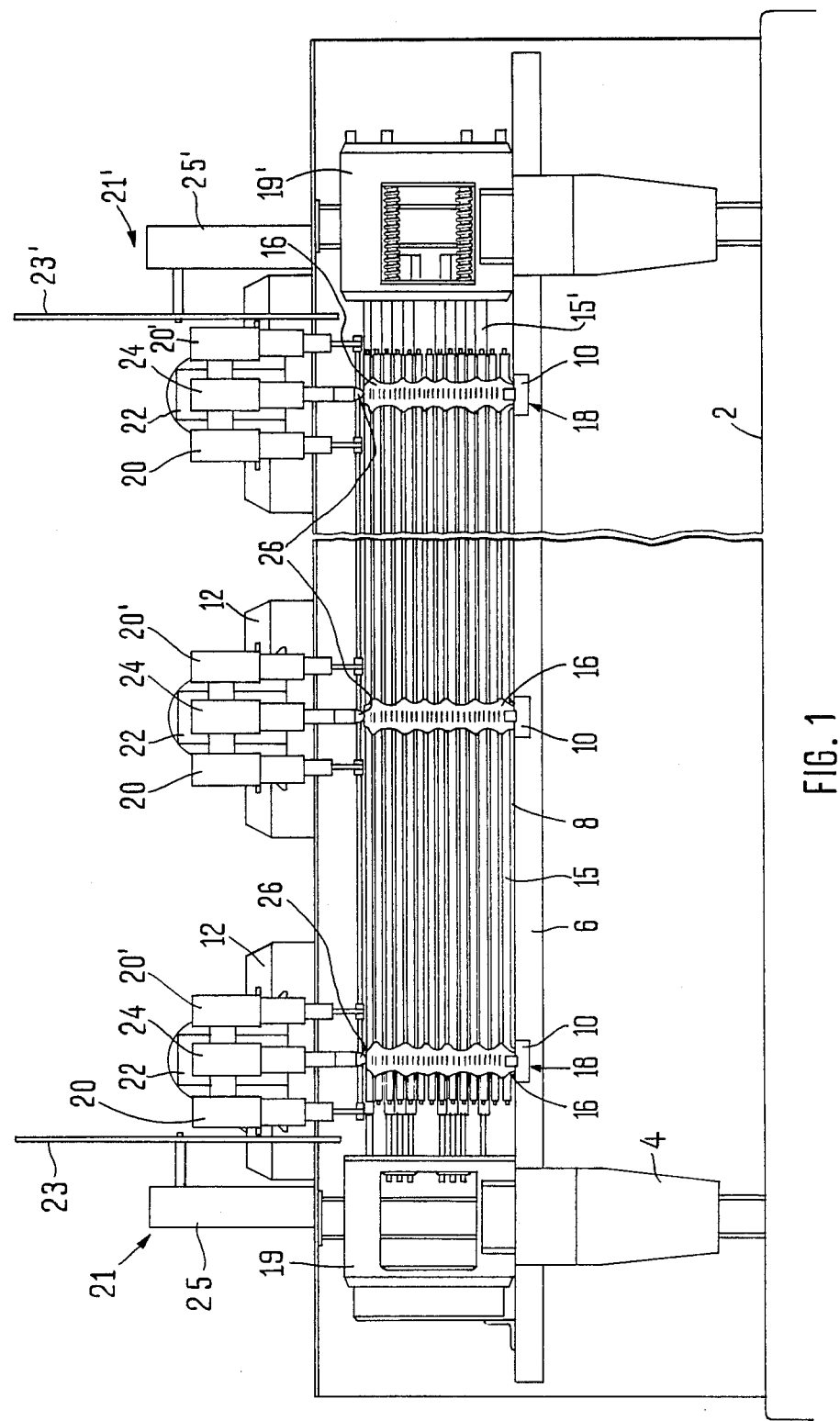
FIG. 1 shows a side view of an apparatus for fuel rod singulizing, together with a cross-sectional view of the fuel element.

The apparatus for the singulizing of fuel rods shown in the above drawings is provided with a base plate 2 and a stand 4. A supporting table 6 for a fuel element 8 is attached to the stand 4 so as to be able to move in a vertical direction. The fuel element 8 is retained on the supporting table 6 in a position which can be determined by means of clamping jaws 10.

Various mobile holders 12 are arranged in guides 11 at the top end of the stand 4 and serve as tool carriers. The drive mechanisms 14 for these holders 12 are arranged behind the stand 4.

The fuel element 8 is provided with a foot piece and a head piece 19, 19', with a larger number of fuel rods 15 arranged between them and a smaller number of control rod guide tubes 15', which are retained by means of spacers 16 in a predetermined matrix arrangement in various planes at a distance from one another. In the fuel rod holder 12, grappling tools 20, 20' are arranged on both sides of each plane of spacers 18, which serve to maintain the rods in a defined position.

A mobile cutting tool 24 is arranged on a separate mounting 22 between the grappling tools 20, 20'. At the lower end of this mounting 22, a cutting disk head 26 is arranged, which can be rotated over an angle of 90°. Furthermore, a grappler 28 is arranged at the holder 22 of the cutting tool 24. Exposed fuel rods and control guide tubes are manipulated and deposited in a storage chamber 30 by means of this grappler 28.

Operation of the fuel rod singularizer is as follows:

As soon as the fuel element 8 is positioned in the right direction for the singulizing procedure and has been fixed in place by means of the clamping jaws 10, the foot piece and the head piece 19, 19' are simultaneously severed by means of the saw arrangement (not shown here), employing a state-of-the-art method.

Figure 2:
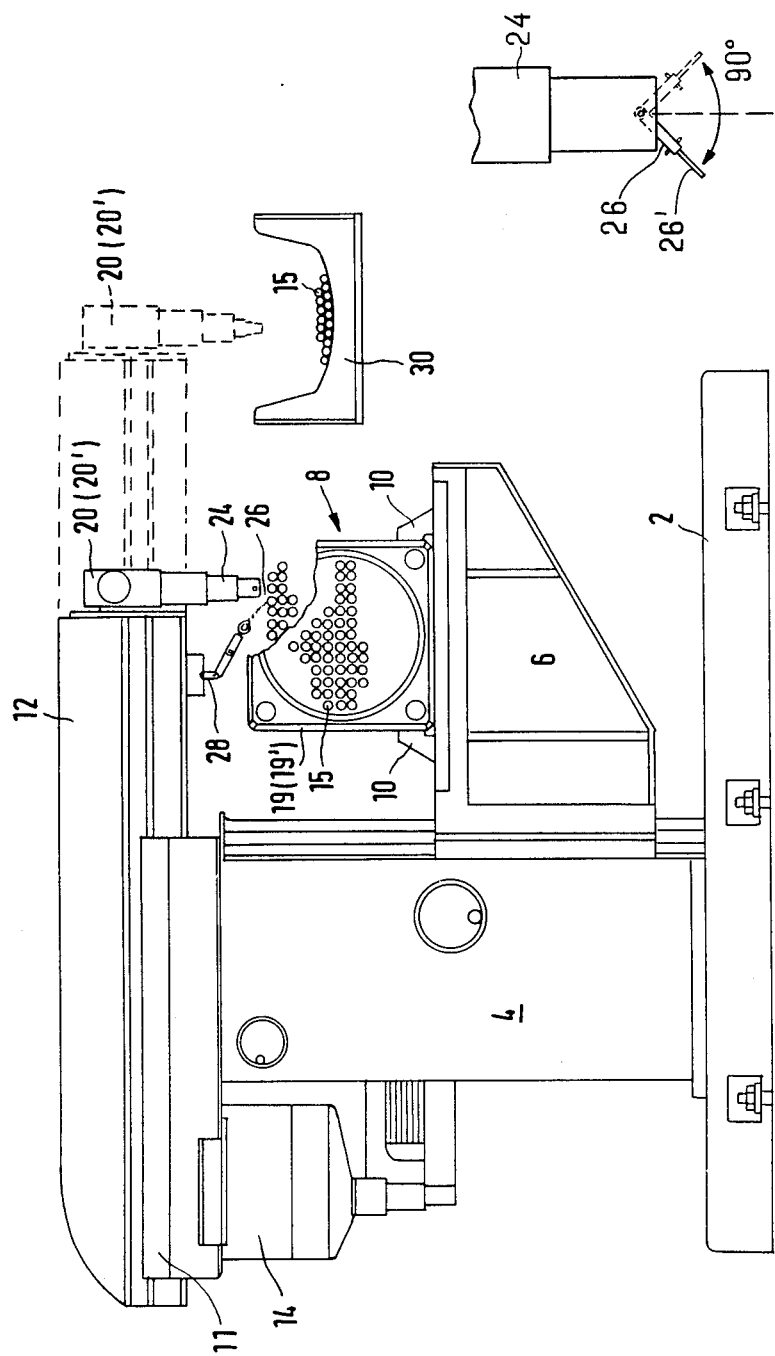
FIG. 2 shows a front elevational view of the apparatus for singulizing fuel rods, together with a cross-sectional view of the fuel elements.

The fuel element is next decomposed or broken down layer by layer in the following manner. First of all, the outermost fuel rod in each spacer plane is firmly retained in the grappling tools. The outermost vertical spacer web of the spacer grid is then severed by means of the cutting tool at an angle of 45°. The upper horizontal spacer web is then gripped in the corresponding grappler 28 and withdrawn upwards at an angle, as shown in FIG. 2. As a result, the next vertical spacer web becomes accessible to the cutting tool. After the second vertical spacer web has been severed, the third vertical spacer web can then be pulled into position by the grappler and thus be ready for cutting. All the vertical spacer webs in the first and uppermost layer of fuel rods can be severed in turn. In this way, the entire horizontal spacer structure in the first layer of fuel rods can be removed or bent upwards.

In the next operation, the individual fuel rods can be lifted, in turn, inwards and out of the fuel element. This operation is accomplished with the help of the grappling tools 20, 20'. After being lifted inwards and out of this fuel element, the fuel rods are deposited in the storage chamber 30 in a compact, space-saving way.

After the first layer of fuel rods has been dealt with, the above procedure is repeated for each subsequent plane of fuel rods, in turn, until the whole fuel element has been taken apart and all the fuel rods have been reshuffled.

Figure 3:
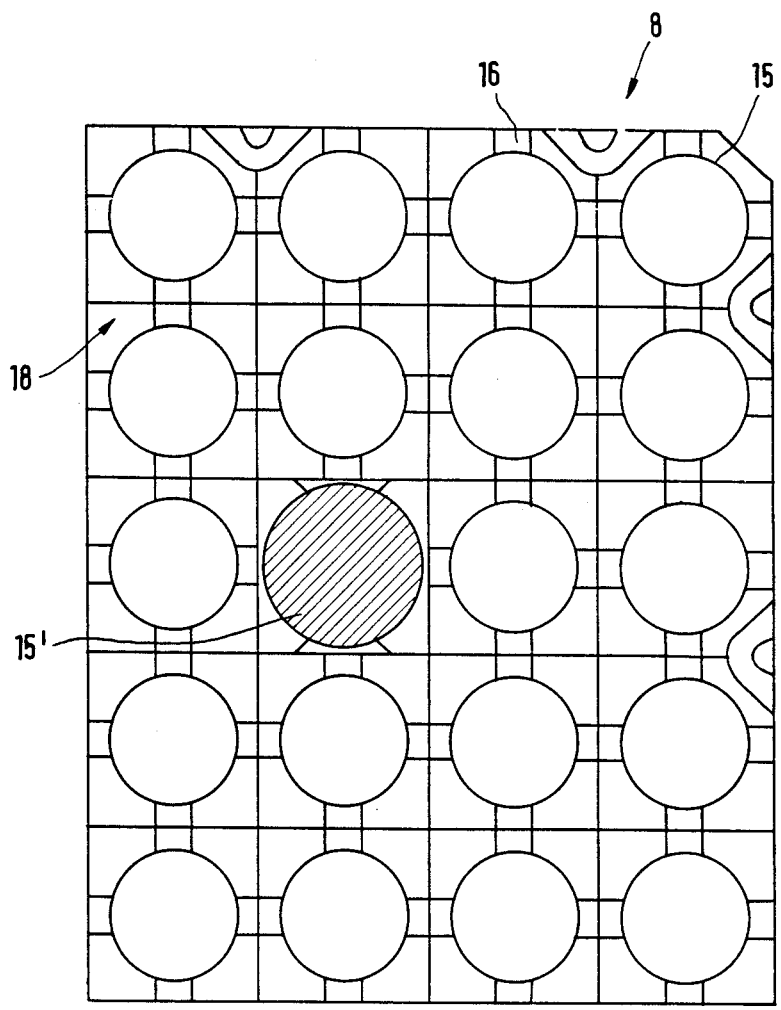
FIG. 3 is a schematic partial view at the plane of a spacer grid, together with fuel rods and a control rod guide tube.

As stated above, each fuel element is provided with some more control rod guide tubes 32, 15'. See FIG. 3. The diameter of these tubes will generally exceed the diameter of the fuel rods, and this enables them to be identified by the grappling tools 20, 20' and stored in a separate chamber (not shown here).

The remaining bent spacer grid and the head and the foot pieces are pressed in a special press and prepared for final storage (not shown here).

The arrangement described here is suitable for use in reactor plants as well as in shielded cells. That is to say, the arrangement is suitable for operation in either dry or wet environments. This singularizing system can operate either horizontally or vertically, and it is operated entirely under remote control.

What is claimed is:

1. A method for singularizing fuel rods in a fuel element, whereby the fuel rods are retained in a spacer grid arrangement between a head piece and a foot piece, characterized by:

severing said head piece and foot piece, wherein the spacer grid arrangement is progressively severed layer by layer from fuel rod plane to fuel rod plane and removed from the fuel rods to expose said fuel rods; and lifting said exposed fuel rods out of said fuel element layer by layer and reshuffling said fuel rods in a more compact arrangement.

2. A method according to claim 1, characterized in that the fuel element is arranged horizontally, that in each plane of fuel rods and in alternate and successive manner a vertical spacer web of said spacer grid is severed and thereafter the associated spacer web is bent apart to expose the next vertical spacer web to be severed, until all fuel rods of a fuel rod plane have been exposed for reshuffling.

3. A method according to claim 1, characterized in that the fuel element is arranged vertically, that in each plane of fuel rods and in alternate and successive manner a horizontal spacer web of said horizontal spacer grid is severed and thereafter the associated vertical spacer web is bent apart to expose the next horizontal spacer web to be severed until all fuel rods of a fuel plane have been exposed for reshuffling purposes.

4. A method according to claims 1, 2 or 3, characterized in that the spacer grid is severed and removed and bent apart and also the fuel rods are lifted and reshuffled layer by layer from one side of the fuel element to the other.

5. An apparatus for singularizing the fuel rods in a fuel element, whereby the fuel rods are retained in a spacer grid arrangement between a head piece and a foot piece and provided with a clamping arrangement to firmly retain the fuel element in position and with a device for severing the head and foot pieces, characterized in that said apparatus comprises, in combination:
   a movable cutting tool for severing the spacer grid in each fuel plane, layer by layer; and
   a movable grappling tool for fastening and positively positioning the fuel rods to be exposed as well as for lifting and reshuffling the exposed fuel rods in a compact arrangement.

6. An apparatus according to claim 5, characterized in that each plane of the spacer grid is provided with a cutting tool and a grappling tool is provided on both sides of each cutting tool.

7. An apparatus according to claims 5 or 6, characterized in that each cutting tool includes its own grappler with which the exposed parts of the spacer grid are bent apart.

8. An apparatus according to claims 5 or 6, characterized in that the end of each cutting tool is provided with a cutting disk head.

9. An apparatus according to claim 7, characterized in that the end of each cutting tool is provided with a cutting disk head.

10. An apparatus according to claim 8, characterized in that the cutting disk head can be rotated over an angle of 90°.

11. An apparatus according to claim 9, characterized in that the cutting disk head can be rotated over an angle of 90°.

12. An apparatus according to claims 7 characterized in that the cutting tools, grappling tools, and grapplers are located in holders which are arranged in a stand in which their movement can be guided in horizontal and vertical directions.

13. An apparatus according to claim 12, characterized in that the cutting tool and the grappler at each layer of bird cage are located in a common holder.

14. An apparatus according to claim 12, characterized in that the holders can be actuated by a drive means attached to the holder.

15. An apparatus according to claim 13, characterized in that the holders can be actuated by a drive means attached to the holder.

16. An apparatus according to claim 14, characterized in that a support table, which can be moved in a vertical direction, is provided for the fuel element and is attached to the stand which, in turn, is fixed to a base plate.

17. An apparatus according to claim 15, characterized in that a support table, which can be moved in a vertical direction, is provided for the fuel element and is attached to the stand which, in turn, is fixed to a base plate.

18. An apparatus according to claim 16, characterized in that the cutting tools and the grapplers are configured and can be suitably controlled for the purpose of separating the webs of the spacer grid stepwise and successively, and for bending apart the severed parts of the spacer grid stepwise and successively.

19. An apparatus according to claim 18, characterized in that in its working position, the cutting disk head of the cutting tool is inclined towards the spacer web which is to be severed.

20. An apparatus according to claim 19, characterized in that the cutting disk head is inclined at an angle of about 45°.

* * * * *